US009817528B2

United States Patent
Hu et al.

(10) Patent No.: US 9,817,528 B2
(45) Date of Patent: Nov. 14, 2017

(54) TOUCH SENSITIVE DEVICE HAVING DIFFERENT SURROUNDING PATTERNS AND RELATED TOUCHSCREEN

(71) Applicant: HIMAX TECHNOLOGIES LIMITED, Tainan (TW)

(72) Inventors: Chia-Wei Hu, Tainan (TW); Wai Pan Wu, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 438 days.

(21) Appl. No.: 14/542,664

(22) Filed: Nov. 17, 2014

(65) Prior Publication Data
US 2015/0378473 A1    Dec. 31, 2015

Related U.S. Application Data

(60) Provisional application No. 62/016,674, filed on Jun. 25, 2014.

(51) Int. Cl.
G06F 3/041    (2006.01)
G06F 3/044    (2006.01)

(52) U.S. Cl.
CPC .................. G06F 3/044 (2013.01)

(58) Field of Classification Search
CPC .......... G06F 3/044; G06F 3/041; G06F 3/045; G06F 3/038; G09G 3/30; G09G 5/00
USPC ........................................ 345/174
See application file for complete search history.

(56) References Cited

U.S. PATENT DOCUMENTS

| | | | |
|---|---|---|---|
| 2012/0227259 A1* | 9/2012 | Badaye | G06F 3/044 29/846 |
| 2013/0076689 A1 | 3/2013 | Li | |
| 2013/0329347 A1* | 12/2013 | Kuo | H03K 17/962 361/679.01 |
| 2014/0022200 A1* | 1/2014 | Moyal | G06F 3/044 345/174 |
| 2014/0168536 A1 | 6/2014 | Guo | |
| 2015/0370369 A1* | 12/2015 | Kuo | G06F 3/03547 345/174 |

FOREIGN PATENT DOCUMENTS

| | | |
|---|---|---|
| TW | 201317868 | 5/2013 |
| TW | 201342442 | 10/2013 |
| TW | 201351229 | 12/2013 |
| TW | 201413514 | 4/2014 |
| TW | M476980 | 4/2014 |

* cited by examiner

*Primary Examiner* — Pegeman Karimi
(74) *Attorney, Agent, or Firm* — Winston Hsu

(57) ABSTRACT

A touch sensitive device includes a plurality of first electrodes; a plurality of second electrodes, disposed around the plurality of first electrodes; a plurality of first surrounding pattern that are formed by the plurality of first electrodes and the plurality of second electrodes and a plurality of second surrounding patterns that are formed by the plurality of first electrodes and the plurality of second electrodes. Each of the first surrounding patterns comprises one of the first electrodes that interleaves with one of the second electrodes. Each of the second surrounding patterns comprises one of the second electrodes that is sandwiched between another of the second electrodes and one of the second electrodes.

20 Claims, 9 Drawing Sheets

| PATB_1 | PATA_2 |
| -150 | 10 |
| PATA_1 | PATB_2 |
| 10 | -150 |

FIG. 7A

| PATB_1 | PATA_2 |
| 0 | 50 |
| PATA_1 | PATB_2 |
| 50 | 0 |

FIG. 7B

TOUCH SENSITIVE DEVICE HAVING DIFFERENT SURROUNDING PATTERNS AND RELATED TOUCHSCREEN

CROSS REFERENCE TO RELATED APPLICATIONS

This application claims the priority of U.S. Provisional Application No. 62/016,674, filed on Jun. 25, 2014, which is included herein by reference in its entirety.

BACKGROUND OF THE INVENTION

1. Field of the Invention

The present invention relates a capacitive touchscreen, and more particularly, to pattern design for electrodes of a touchscreen.

2. Description of the Prior Art

Since touch is the most intuitive and natural way in human-machine interaction, touchscreens thus has already been widely applied in personal computers, tablets, smart-phones, portable devices, handheld devices, and other fields. Recently, capacitive touch screens are developed rapidly and gradually replaces usage of touchscreens based on other technologies, such as resistive touchscreens.

A capacitive touchscreen utilizes a capacitive touch sensitive device (i.e., an active sensing array), which includes drive electrodes and senses electrodes, works with corresponding control and sense circuitry, to sense a user's touch and determine a touch location. A driving pulse is applied to the drive electrodes on a line-by-line basis. Accordingly, charges impressed on the driving electrode in the presence of the driving pulse capacitively couple to the sense electrodes of the touch sense device that are intersected. This leads to a measurable current and/or voltage on the sensing electrodes. The relationship between the driving pulse and signal measured on the sensing electrodes is related to the capacitance coupling the driving and sensing electrodes. It is therefore possible to measure capacitances (i.e., mutual-capacitance) of coupling capacitors at the surroundings according to the driving signal and the measured sensing signals. When bringing a touch object (e.g. a finger or conductive stylus) near the touch sensitive device system, it changes a local electric field between the drive electrode and the sense electrode (since the touch object is substantially connected to a ground, the electric field will be absorbed), which reduces the mutual-capacitances measured at these surroundings. Hence, a touch location of the touch object can be accurately determined with a decrease in measured mutual-capacitances.

In some operation condition, the touch sensitive device may not share a common ground with a touch object. For example, when the device using the capacitive touchscreen is placed on an electrical insulation object, such as a wooden/plastic table, a bed, a carton, a plastic box or the like, the touch sensitive device and the touch object don't share a common ground (assuming the users stands on the floor). Under such conditions, the touch object can be considered floating with respect to the ground to which the touch sensitive device is connected. Hence, the touch object becomes a floating conductor. This introduces a capacitance difference between the touch object and the touch sensitive device with respect to the ground the touch device is connected to. FIG. 1A and FIG. 1B illustrate how such conditions has an influence on the measured mutual-capacitance between the drive electrode and the sense electrode. In FIG. 1A, the touch object FINGER shares a common ground with the touch sensitive device (i.e., the sense electrode RX and the drive electrode TX). Thus, when the touch object FINGER is brought near the touch sensitive device, a measured mutual-capacitance between the sense electrode RX and the drive electrode TX decreases because the touch object absorbs the electric field therebetween. However, in FIG. 1B, the touch object FINGER does not share a common ground with the touch sensitive device. A capacitance difference C will be added between the sense electrode RX and the drive electrode TX, such that the decrease in measured mutual-capacitance become significantly smaller compared to the case where the touch object FINGER shares a common ground with the touch sensitive device. Table 1 shows the difference between two conditions.

TABLE 1

|  | Common ground | Non-common ground |
|---|---|---|
| Cm (before touch) | 1.5 pF | 1.5 pF |
| Cm (after touch) | 1.2 pF | 1.4 pF |

As shown by the Table 1, the non-common ground condition causes an unrecognizably tiny sense signal (the difference in measured mutual capacitance (Cm) before the touch is applied and after the touch is applied). This is difficult for processing circuitry of the touch sensitive device to analyze the sense signal to further the touch location.

There may be some approaches that can fix such problem. However, as the touchscreen could be operated in different operation conditions, such as by handheld, placed on the table, on placed on the bed, the capacitance difference between touch object and the touch sensitive device could be quite different in each operation condition. Hence, there is a need to provide an approach to make the touch sensitive device suitable to different operation conditions and ensure that the touch sensitive device can always provide a recognizable sense signal regardless of the non-common ground related capacitance difference.

SUMMARY OF THE INVENTION

It is therefore of objectives of the present invention to provide multiple surrounding patterns for electrodes of a touchscreen to ensure that the touchscreen can always derive a recognizable sense signal in different operation conditions.

According to one embodiment of the present invention, a touch sensitive device is provided. The touch sensitive device comprises: a plurality of first electrodes; a plurality of second electrodes, disposed around the plurality of first electrodes; a plurality of first surrounding pattern that are formed by the plurality of first electrodes and the plurality of second electrodes and a plurality of second surrounding patterns that are formed by the plurality of first electrodes and the plurality of second electrodes. Each of the first surrounding patterns comprises one of the first electrodes that interleaves with one of the second electrodes. Each of the second surrounding patterns comprises one of the second electrodes that is sandwiched between another of the second electrodes and one of the first electrodes.

According to one embodiment of the present invention, a touchscreen is provided. The touchscreen comprise: a display device, a touch control device, and a touch sensitive device that is controlled by the touch control device. The touch sensitive device comprises: a plurality of first electrodes; a plurality of second electrodes, disposed around the plurality of first electrodes; a plurality of first surrounding pattern that are formed by the plurality of first electrodes and the plurality of second electrodes and a plurality of second surrounding patterns that are formed by the plurality of first electrodes and the plurality of second electrodes. Each of the first surrounding patterns comprises one of the first electrodes that interleaves with one of the second electrodes. Each of the second surrounding patterns comprises one of the second electrodes that is sandwiched between another of the second electrodes and one of the first electrodes.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6, FIG. 7A and FIG. 7B illustrates how an arrangement of the first surrounding patterns PATA_1-PATA_2 and the second surrounding patterns PATB_1-PATB_2 of the touch sensitive device 100 improves the sense signal.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

As mentioned above, in order to assure recognizable sense signal in different operation conditions, the present invention provides a touch sensitive device (i.e., an active sensing array) having multiple types of surrounding patterns for drive electrodes and sense electrodes.

Figure 1B:
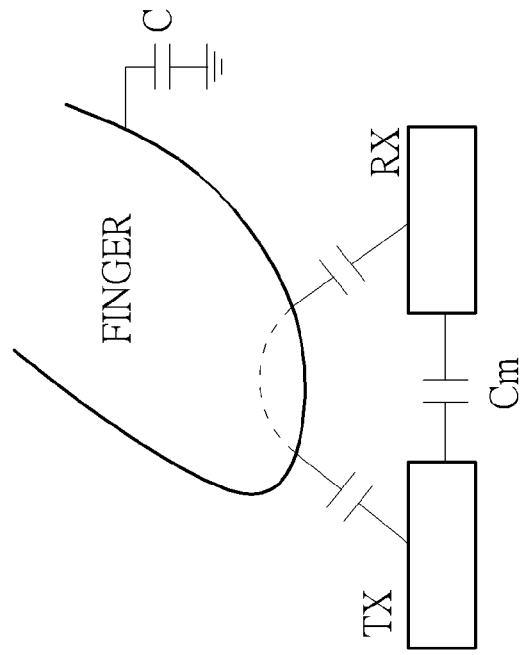
FIG. 1A and FIG. 1B illustrates the difference between mutual-capacitances measured in different operation conditions.
Figure 1A:
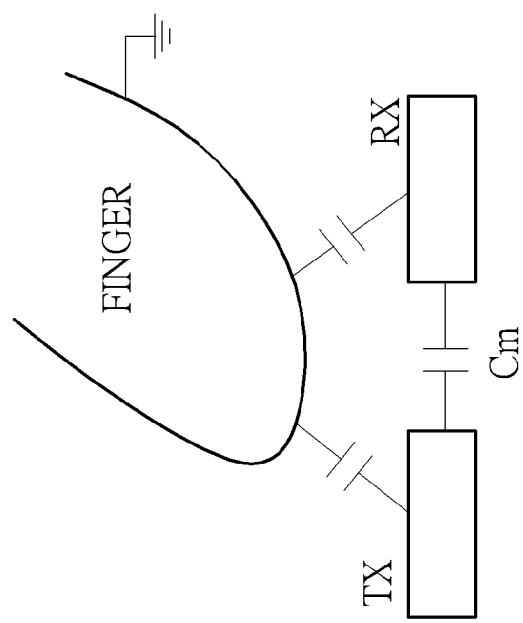
Figure 2:
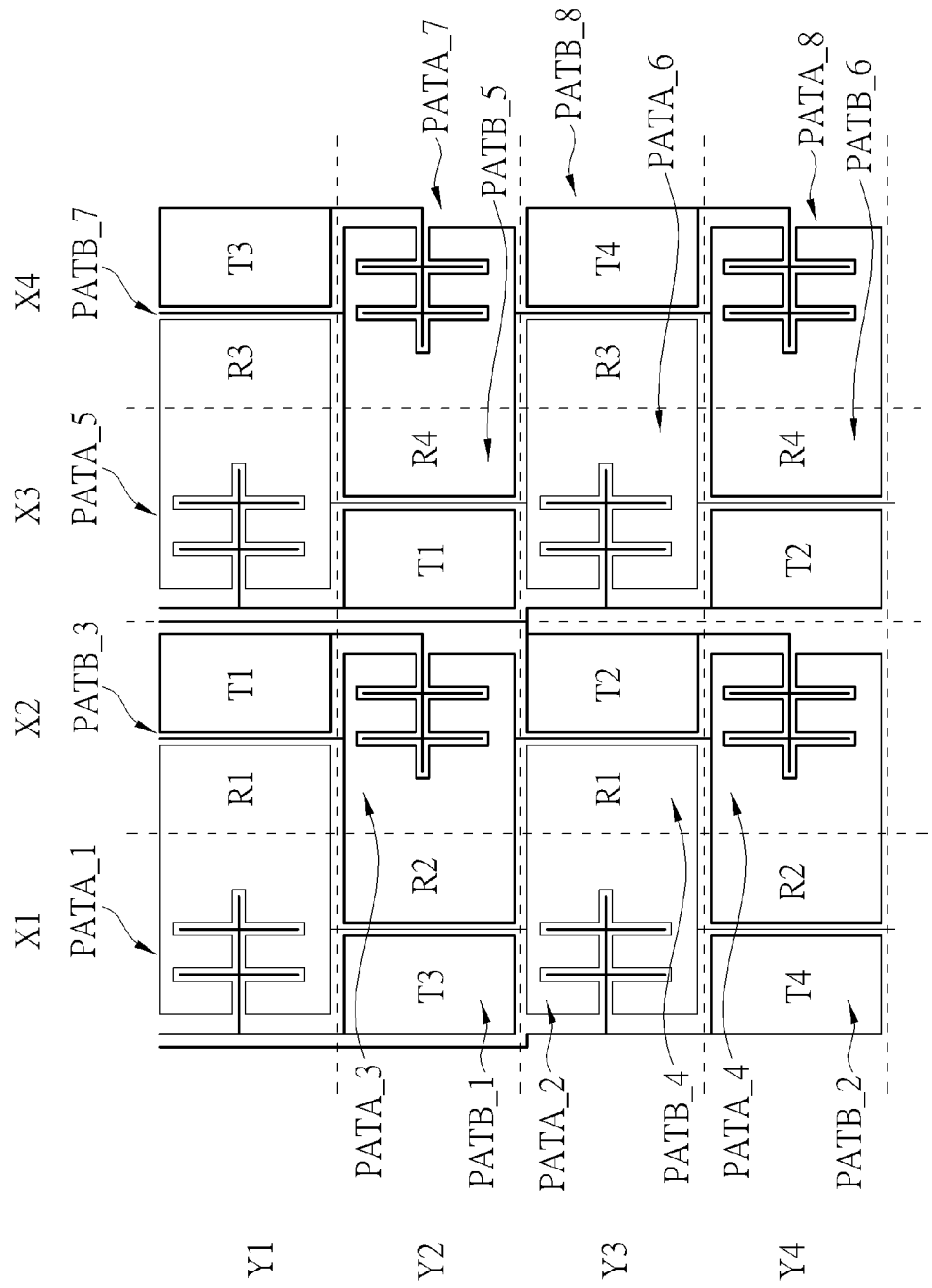
FIG. 2 illustrates a simplified layout of a portion of a touch sensitive device according to one exemplary embodiment of the present invention.

FIG. 2 illustrates a simplified layout of a portion of a touch sensitive device according to one exemplary embodiment of the present invention. As illustrated, a touch sensitive device 100 comprises drive electrodes T1-T4, and sense electrodes R1-R4. This is just for ease of explanation. Other numbers of drive electrodes and sense electrodes may also be employed. In one embodiment, the drive electrodes T1-T4 are form on a first metal layer, and the sense electrodes R1-R4 are form on a second metal layer different from the first metal layer, where the first metal layer and the second metal layer can be any conductive film such as indium tin oxide (ITO), indium zinc oxide (IZO) or nano silver. In other embodiments, the drive and receive electrodes may be formed on the same layer that could be the above-mentioned conductive films. Such single layer electrode patterns may be referred to as co-planar, and may be formed on glass. In the following, certain electrodes are designated as drive electrodes while others are designated as receive electrodes. However, this is not intended to limit the scope of the invention. According to various embodiments, drive electrodes and receive electrodes are interchangeable. For example, the drive electrodes T1-T4 could be used as receive electrodes and the receive electrodes R1-R4 could be used as drive electrodes in one embodiment of the present invention.

The drive electrodes T1-T4 and sense electrodes R1-R4 form two different types of first surrounding patterns PATA_1-PATA_8 and second surrounding patterns PATB_1-PATB_8, respectively. Each of drive electrodes T1-T4 has two respective same portions in different patterns that are not adjacent. For example, one portion of the drive electrodes T3 is in the first surrounding pattern PATA_1, while another portion of the drive electrodes T3 is in the second surrounding pattern PATB_7. They are interconnected by wires or traces (not shown). Similarly, each of sense electrodes R1-R4 also has two respective same portions in different pattern. For example, one portion of the sense electrodes R1 is in the first surrounding pattern PATA_1, while another portion of the sense electrodes R1 is in the first surrounding pattern PATA_2. They are interconnected by wires or traces (the wire passing through electrodes R1 and T2 in pattern PATB_4). Further, each of drive electrodes T1-T4 extends across and has two different portions in different patterns that are adjacent. For example, the drive electrode T3 has a portion (in square shape) in the second surrounding pattern PATB_1 while a portion (in branch shape) in the first surrounding pattern PATA_1. Similarly, the each of sense electrodes R1-R4 also extends across and has two different portions in different patterns that are adjacent. For example, the sense electrode R1 has a portion (in rectangular shape) in the second surrounding pattern PATB_3 while a portion (in rectangular shape having multiple slots) in the first surrounding pattern PATA_1.

Figure 3:
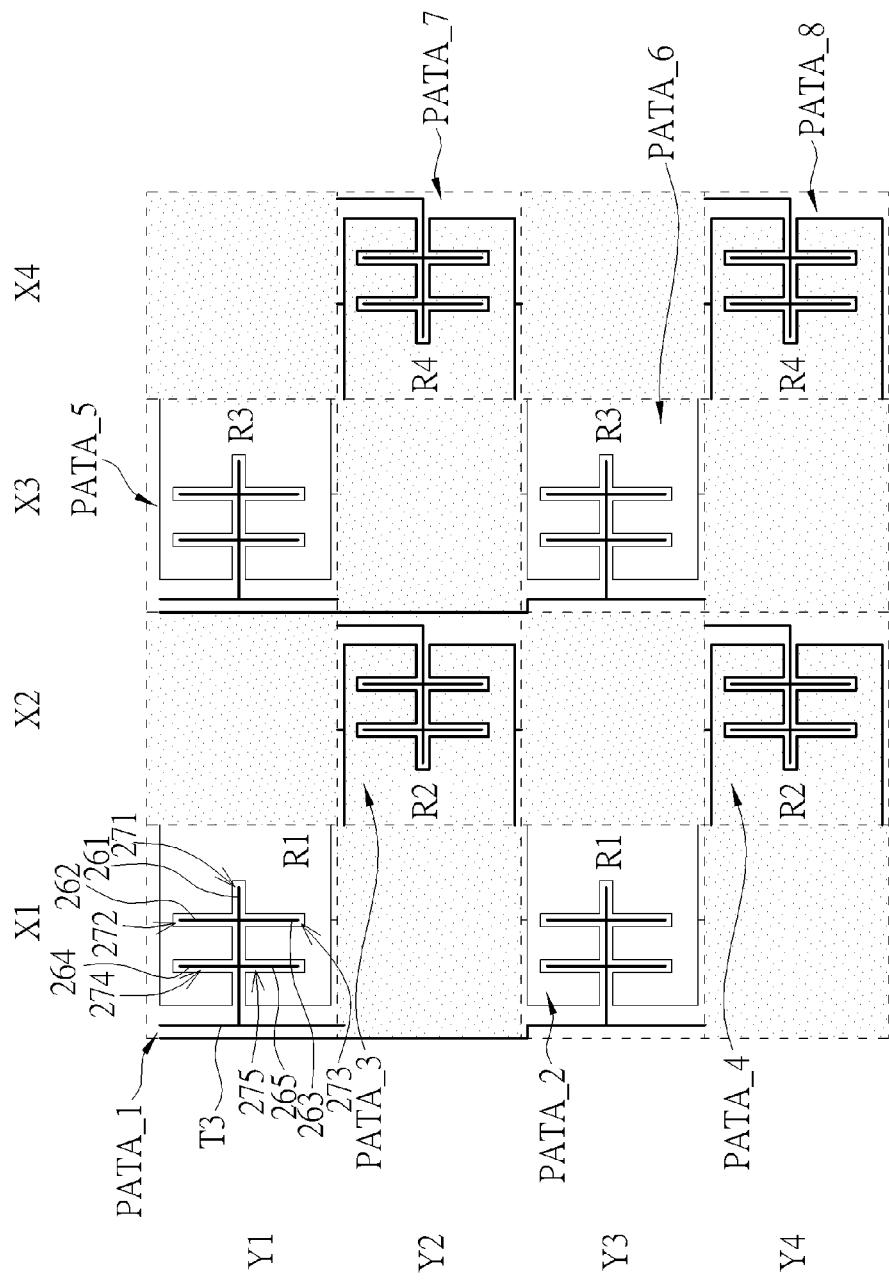
FIG. 3 illustrates first surrounding pattern patterns of the touch sensitive device 100 in a clear view.
Figure 4:
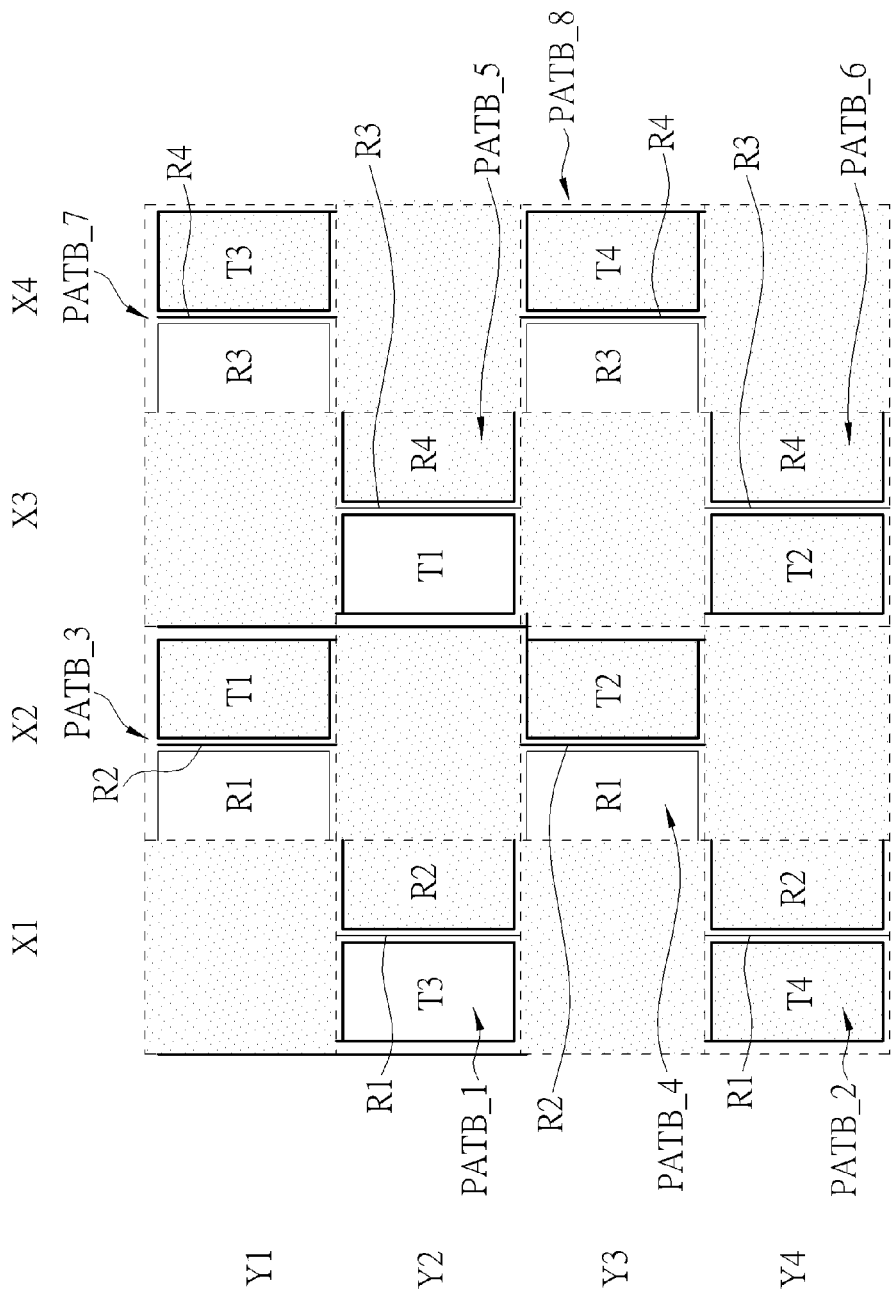
FIG. 4 illustrates second surrounding pattern patterns of the touch sensitive device 100 in a clear view.

These surrounding patterns PATA_1-PATA_8 and PATB_1-PATB_8 are respectively shown in a clear view in FIG. 3 and FIG. 4. FIG. 3 illustrates the first surrounding pattern patterns PATA_1-PATA_8 of the touch sensitive device 100. As shown, in the first surrounding pattern PATA_1, the drive electrode T3 has multiple protruding branches 261-265 and the sense electrode R1 has multiple open-ended slots 271-275. Each of the protruding branches 261-265 protrudes into one of the open-ended slots 271-275, respectively. However, they do not are interconnected with each other. As the sense electrode R1 is interleaved with the drive electrode T3 by multiple branches and open-ended slots in the first pattern PATA_1, the sense electrode R1 and the drive electrode T3 has a long adjacent perimeter therebetween. In view of this, the first pattern PATA_1 (as well as the first patterns PATA_2-PATA_8) provides an increased mutual-capacitance between the drive electrode and the sense electrode because the long adjacent perimeter enhances the electric field between electrodes. When the touch object and the touch sensitive device 100 shares a common ground (or there is merely a tiny capacitance difference therebetween), the first patterns PATA_1-PATA_8 provides a considerably recognizable sense signal when the touch occurs.

Figure 5B:
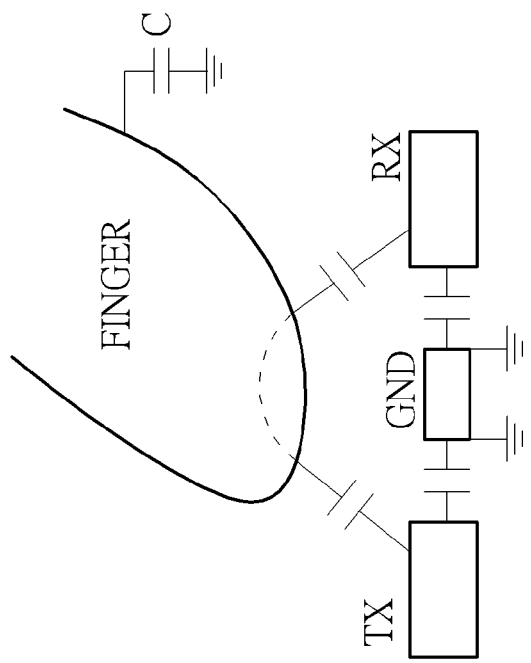
FIG. 5A and FIG. 5B illustrates the difference between mutual-capacitances measured in different operation conditions by the second surrounding patterns.
Figure 5A:
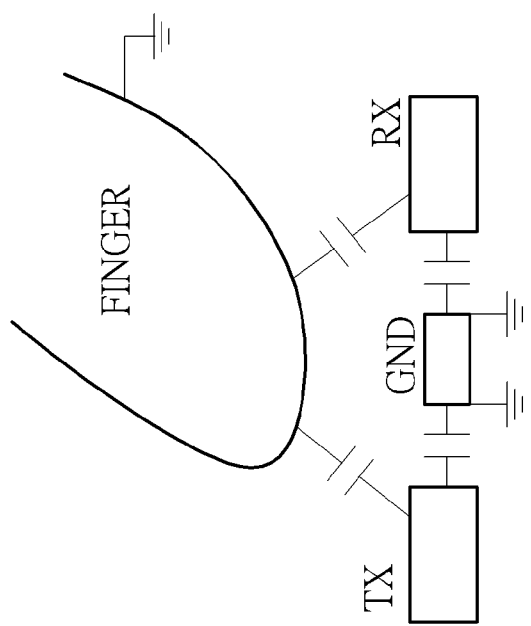

FIG. 4 illustrates the second surrounding pattern patterns PATB_1-PATB_8 of the touch sensitive device 100. In the second surrounding pattern PATB_1, the sense electrode R1 (or its trace) is disposed and sandwiched between the drive electrode T3 and the sense electrode R2 and they are not interconnected with each other. As the sense electrode R1 is not floating (which is connected to a source or ground), while the drive electrode T3 and the sense electrode R2 are being driven and measured, the sense electrode R1 forms a shielding electrode between the drive electrode T3 and the sense electrode R2. Such shielding electrode shields the electric field between the drive electrode T3 and the sense electrode R2. Therefore, a mutual-capacitance that measured on the sense electrode R2 becomes very tiny. FIG. 5A and FIG. 5B illustrates how the measured capacitance changes in such patterns when the touch object and the touch sensitive device 100 does not share a common ground. Referring to FIG. 5A, a shielding electrode GND (e.g., the sense electrode R1) is sandwiched and disposed between a drive electrode TX (e.g., the drive electrode T3) and a sense electrode RX (e.g., the sense electrode R2). As the shielding electrode GND shields the electric field between the drive electrode T3 and the sense electrode R2, the measured mutual-capacitance (Cm) therebetween become to be very tiny (see Table 2) before the touch is applied. Once the touch is applied, the electrical field will be almost wholly absorbed. Hence, the measured mutual-capacitance in the presence of the touch object will become unrecognizable or even zero. On the other hand, in FIG. 5B, if the touch object FINGER that does not share a common ground with the touch sensitive device 100 touches and is in proximity of these electrodes, the measured mutual-capacitance (Cm) in the presence of the touch object will increase. This is because a capacitance difference C will be added between the sense electrode RX and the drive electrode TX, increasing the measured mutual-capacitance.

TABLE 2

|  | Common ground | Non-common ground |
|---|---|---|
| Cm (before touch) | 0.3 pF | 0.3 pF |
| Cm (after touch) | 0 pF | 0.5 pF |

Hence, the second surrounding patterns PATB_1-PATB_8 are useful to sense the touch under the condition that the touch object does not share a common ground with the touch sensitive device. The second surrounding patterns can provide a recognizable sense signal (although it is a negative value).

Briefly speaking, the first surrounding pattern PATA_1-PATA_8 provides a considerably recognizable positive sense signal when the touch object shares a command ground with the touch sensitive device 100, whereas the second surrounding pattern PATB_1-PATB_8 provides a considerably recognizable negative sense signal when the touch object does not share a command ground with the touch sensitive device 100. Hence, if the first surrounding pattern PATA_1-PATA_8 and the second surrounding pattern PATB_1-PATB_8 can be properly arranged in each area of the touch sensitive device 100, the touch sensitive device 100 can always provide considerably recognizable sense signal no matter what condition the touch sensitive device is operated in. As shown by FIG. 2, the first surrounding patterns PATA_1-PATA_8 and the second surrounding patterns PATB_1-PATB_8 of the touch sensitive device 100 are arranged in a mosaic pattern. Each of the first surrounding patterns PATA_1-PATA_8 is surrounded by multiple ones of the second surrounding patterns PATB_1-PATB_8, while each of the second surrounding patterns PATB_1-PATB_8 is also surrounded by multiple ones of the first surrounding patterns PATA_1-PATA_8. Therefore, each touch is possible to cover both the first surrounding patterns PATA_1-PATA_8 and the second surrounding patterns PATB_1-PATB_8.

Figure 6:
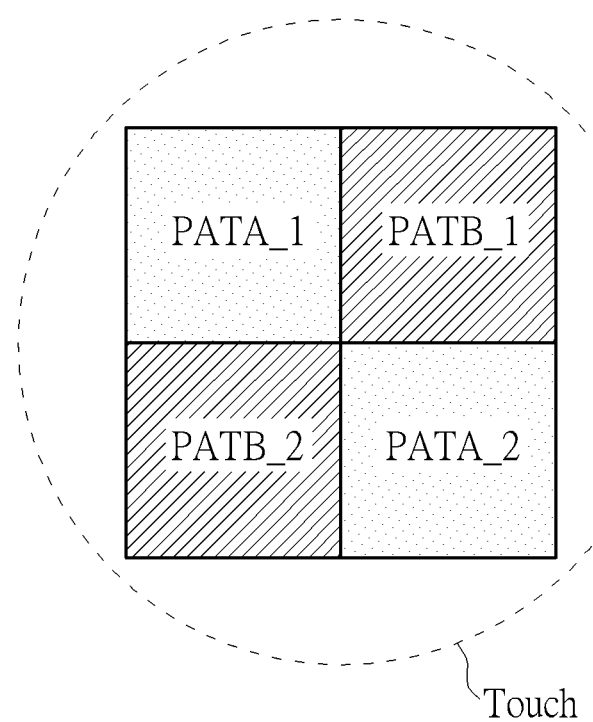

FIG. 6, FIG. 7A and FIG. 7B illustrates how an arrangement of the first surrounding patterns PATA_1-PATA_2 and the second surrounding patterns PATB_1-PATB_2 of the touch sensitive device 100 improves the sense signal. As shown, in a view of a square area, the first surrounding patterns are diagonally disposed, and the second surrounding patterns are also diagonally disposed. When a touch occurs on the square area as shown in FIG. 6, sense signals corresponding to different conditions are shown in FIG. 7A and FIG. 7B. As shown in FIG. 7A, when a touch object that does not share a command ground with the touch sensitive device 100 touches the square area, the second surrounding patterns PATB_1 and PATB_2 can provide the considerably recognizable sense signal "−150" while the first surrounding patterns PATA_1 and PATA_2 only provides the tiny sense signal "10". Hence, the considerably recognizable sense signal "−150" can be used to compensate the tiny sense signal "10" to derive a more recognizable sense signal on the first surrounding patterns PATA_1 and PATA_2. In FIG. 7B, when the touch object that shares a command ground with the touch sensitive device 100 (or there is a large capacitance difference therebetween) touches the square area, the first surrounding patterns PATA_1 and PATA_2 can provide the considerably recognizable sense signal "50" while the second surrounding patterns PATB_1 and PATB_2 only provides the tiny sense signal "0". Hence, the considerably recognizable sense signal "50" can be used to compensate the tiny sense signal "0" to derive a more recognizable sense signal on the second surrounding patterns PATB_1 and PATB_2. As long as an area of the touch can cover by the square area, a recognizable sense signal can be always provided in any operation conditions.

Figure 8:
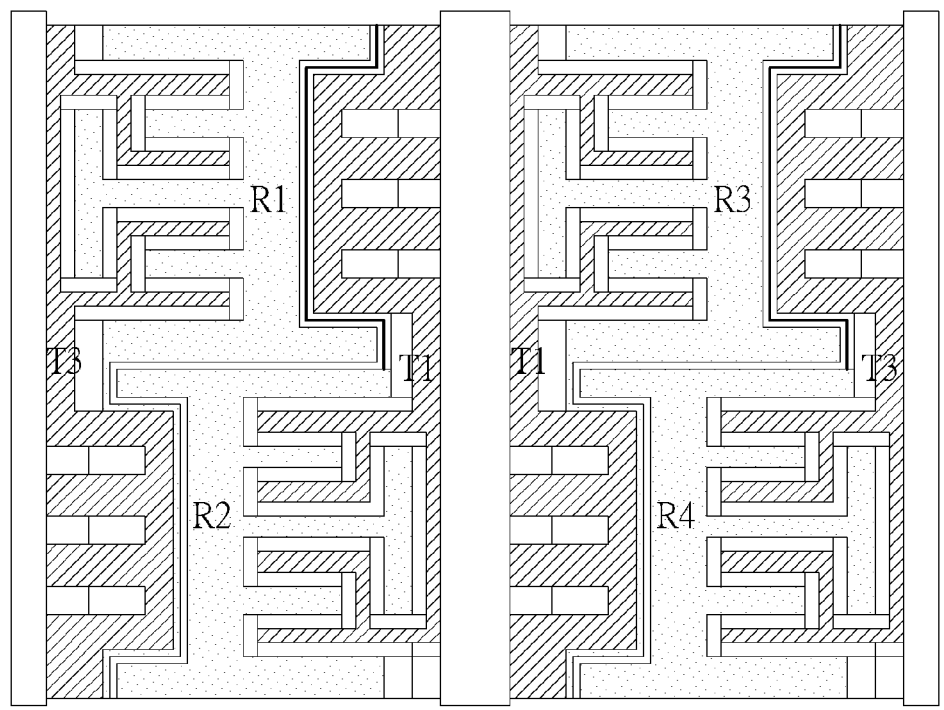
FIG. 8 illustrates a detailed layout of a touch sensitive device 100 according to one exemplary embodiment of the present invention

FIG. 8 illustrates a detailed possible layout of a touch sensitive device 100 according to one exemplary embodiment of the present invention. However, this is not intended for a limitation of the present invention. It should be noted that although the drawings and description provides some specific patterns of electrodes of touch sensitive device of the present invention, this is just for ease of explanation. For example, the patterns of electrodes shown in FIG. 2 may have different shapes in the various embodiments. As long as any implementation of a touch sensitive device includes multiple surrounding patterns for electrodes, they all fall within the scope of the present invention.

Figure 9:
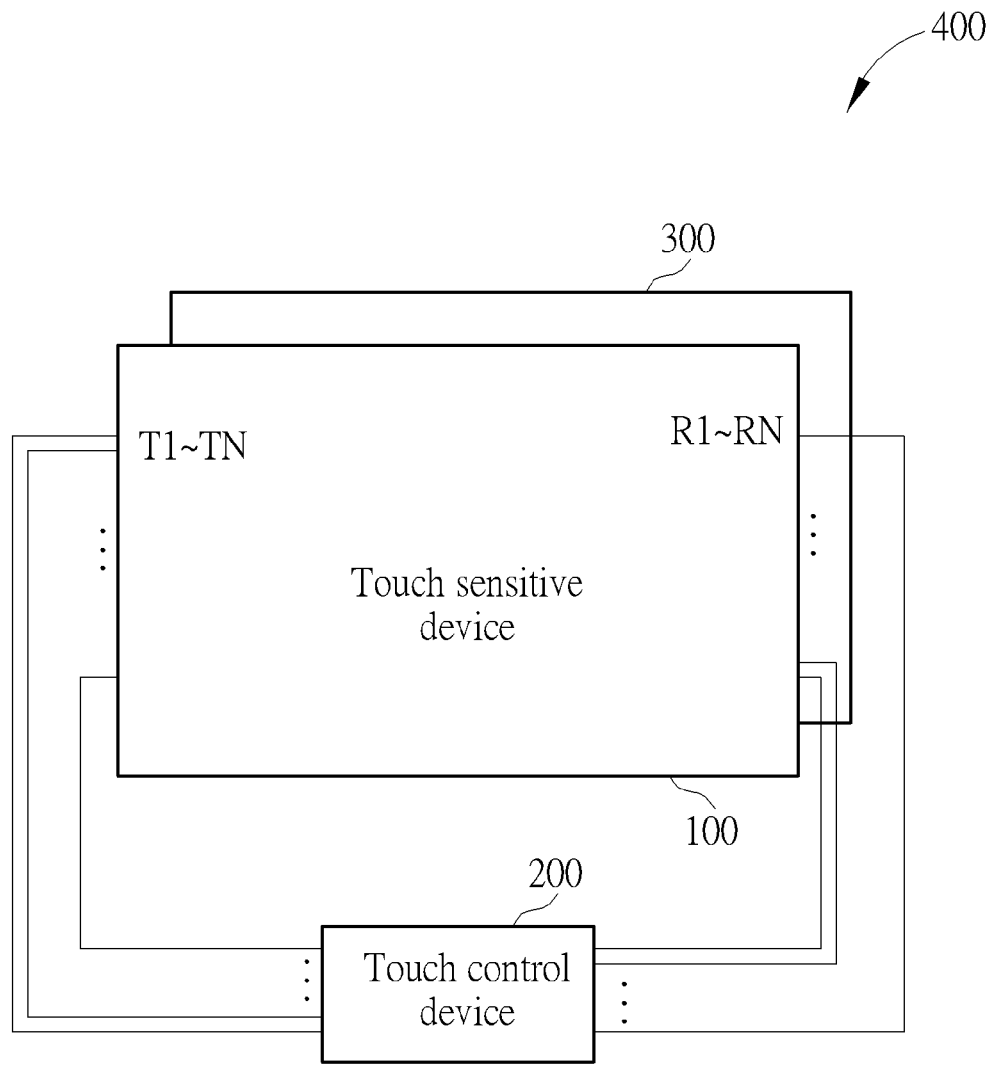
FIG. 9 illustrates a block diagram of a touchscreen according to one exemplary embodiment of the present invention.

FIG. 9 illustrates a block diagram of a touchscreen according to one exemplary embodiment of the present invention. As shown by FIG. 9, a touchscreen 400 includes the touch sensitive device 100, a touch control device 200 and a display device 300. The display device 300 is typically a LCD or OLED display underlying the touch sensitive device 100. Drive electrodes T1-TN and sense electrodes R1-RN are coupled to the touch control device 200 via wires or traces. The touch control device 200 applies pulse signals to the drive electrodes T10-TN and measures signals on the sense electrodes R1-RN. When the touch object is brought in proximity of the touch sensitive device 100, a change of the mutual-capacitance (i.e., the sense signal) could be detected. The touch control device 200 analyzes the sense signal to determine the touch and its location. In one embodiment, the touch control device 200 further translates the relationship between the drive electrode and the sense electrode into a set of coordinates because the drive electrodes and the sense electrodes in the present invention are not intersected like a traditional grid pattern. For example, when the touch object is brought in proximity of first surrounding pattern PATA_1, and a driving pulse is applied to the drive electrode T3, a sense signal can be detected by the sense electrode R1. The touch control device 200 will translate the touch to regarding to electrodes T3 and R1 a touch location defined by the coordinate (X1, Y1). Similarly, the touch detected on the first surrounding pattern PATA_2 regarding electrodes R1 and T4 will be translated to a touch location defined by the coordinate (X1, Y3). The touch control device 200 may store information regarding how to translate the relationship of electrodes into coordinate.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, the present invention provides special surrounding patterns for the electrodes of the touchscreen. These different surrounding patterns are disposed at different locations of the touchscreen, and suitable for different operation conditions. Hence, no matter what operation condition the touchscreen is operated, there are always suitable surrounding patterns around the location of a touch, such that considerably recognizable sense signals of the touch can be always derived.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch sensitive device, comprising:
   a plurality of first electrodes;
   a plurality of second electrodes, disposed around the plurality of first electrodes;
   a plurality of first surrounding patterns, formed by the plurality of first electrodes and the plurality of second electrodes, each comprising:
   one of the first electrodes that is interleaved with one of the second electrodes; and
   a plurality of second surrounding patterns, formed by the plurality of first electrodes and the plurality of second electrodes, each comprising:
   one of the second electrodes that is sandwiched between another of the second electrodes and one of the first electrodes;
   wherein the first surrounding patterns lead to a more significant capacitance change than the second surrounding patterns when a touch object shares a common ground with the touch sensitive device; and the second surrounding patterns lead to a more significant capacitance change than the first surrounding patterns when the touch object does not share a common ground with the touch sensitive device.

2. The touch sensitive device of claim 1, wherein the first surrounding patterns and the second surrounding patterns are arranged in a mosaic pattern.

3. The touch sensitive device of claim 1, wherein one of the first surrounding patterns is surrounded by multiple ones of the second surrounding patterns.

4. The touch sensitive device of claim 1, wherein one of the first surrounding patterns comprises a first portion of one of the first electrodes, while one of the second surrounding patterns comprises a second portion of the one of the first electrodes, and the first portion and the second portion of the one of the first electrodes are different in shape and in size.

5. The touch sensitive device of claim 1, wherein one of the first surrounding patterns comprises a first portion of one of the second electrodes, while one of the second surrounding patterns comprises a second portion of the one of the second electrodes, and the first portion and the second portion of the one of the second electrodes are different in shape and in size.

6. The touch sensitive device of claim 1, wherein one of the second surrounding patterns comprises a first portion of one of the first electrodes, while another of the second surrounding patterns comprises a second portion of the one of the first electrodes, and the first portion and the second portion of the one of the first electrodes are identical in shape and in size.

7. The touch sensitive device of claim 1, wherein one of the first surrounding patterns comprises a first portion of one of the second electrodes, while another of the first surrounding patterns comprises a second portion of the one of the second electrodes, and the first portion and the second portion of the one of the second electrodes are identical in shape and in size.

8. The touch sensitive device of claim 1, wherein the first electrodes and the second electrodes are substantially non-overlapping.

9. The touch sensitive device of claim 1, wherein in each of the first surrounding patterns, the one of the first electrodes has multiple protruding branches, the one of the second electrodes has multiple open-ended slots, and the multiple open-ended slots are interleaved with the multiple protruding branches.

10. The touch sensitive device of claim 1, wherein the first electrodes are drive electrodes, while the second electrodes are sense electrodes.

11. A touchscreen, comprising:
    a display device;
    a touch control device; and
    a touch sensitive device, controlled by the touch control device comprising:
    a plurality of first electrodes;
    a plurality of second electrodes, disposed around the plurality of first electrodes;
    a plurality of first surrounding patterns, formed by the plurality of first electrodes and the plurality of second electrodes, each comprising:
    one of the first electrodes that is interleaved with one of the second electrodes; and a plurality of second surrounding patterns, formed by the plurality of first electrodes and the plurality of second electrodes, each comprising:
one of the second electrodes that is sandwiched between another of the second electrodes and one of the first electrodes;

wherein the first surrounding patterns lead to a more significant capacitance change than the second surrounding patterns when a touch object shares a common ground with the touch sensitive device; and the second surrounding patterns lead to a more significant capacitance change than the first surrounding patterns when the touch object does not share a common ground with the touch sensitive device.

12. The touchscreen of claim 11, wherein the first surrounding patterns and the second surrounding patterns are arranged in a mosaic pattern.

13. The touchscreen of claim 11, wherein one of the first surrounding patterns is surrounded by multiple ones of the second surrounding patterns.

14. The touchscreen of claim 11, wherein one of the first surrounding patterns comprises a first portion of one of the first electrodes, while one of the second surrounding patterns comprises a second portion of the one of the first electrodes, and the first portion and the second portion of the one of the first electrodes are different in shape and in size.

15. The touchscreen of claim 14, wherein one of the first surrounding patterns comprises a first portion of one of the second electrodes, while one of the second surrounding patterns comprises a second portion of the one of the second electrodes, and the first portion and the second portion of the one of the second electrodes are different in shape and in size.

16. The touchscreen of claim 11, wherein one of the second surrounding patterns comprises a first portion of one of the first electrodes, while another of the second surrounding patterns comprises a second portion of the one of the first electrodes, and the first portion and the second portion of the one of the first electrodes are identical in shape and in size.

17. The touchscreen of claim 16, wherein one of the first surrounding patterns comprises a first portion of one of the second electrodes, while another of the first surrounding patterns comprises a second portion of the one of the second electrodes, and the first portion and the second portion of the one of the second electrodes are identical in shape and in size.

18. The touchscreen of claim 11, wherein the first electrodes and the second electrodes are substantially non-overlapping.

19. The touchscreen of claim 11, wherein in each of the first surrounding patterns, the one of the first electrodes has multiple protruding branches, the one of the second electrodes has multiple open-ended slots, and the multiple open-ended slots are interleaved with the multiple protruding branches.

20. The touchscreen of claim 11, wherein the first electrodes are drive electrodes, while the second electrodes are sense electrodes.

* * * * *